June 3, 1969   F. E. BUCK ET AL   3,447,627
UNDERWATER SOUND REFLECTOR APPARATUS
Filed Sept. 29, 1967
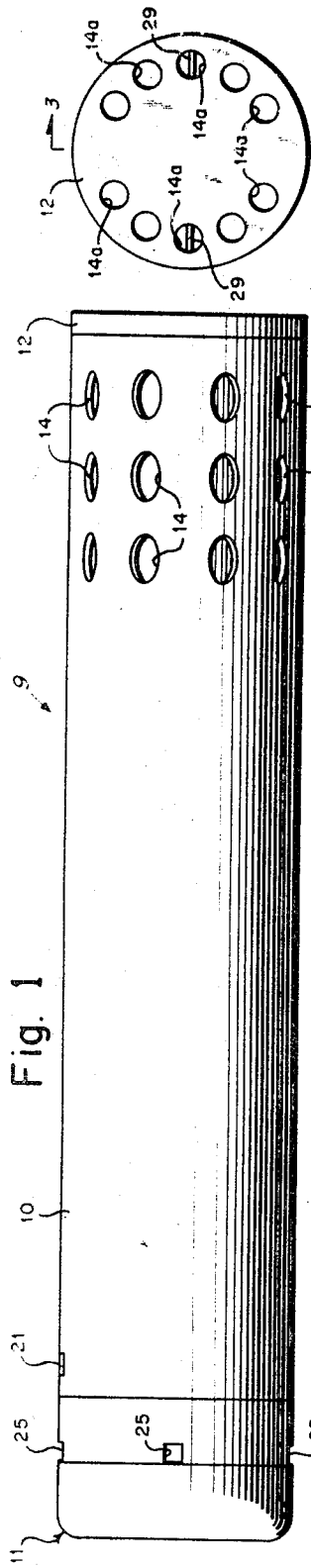
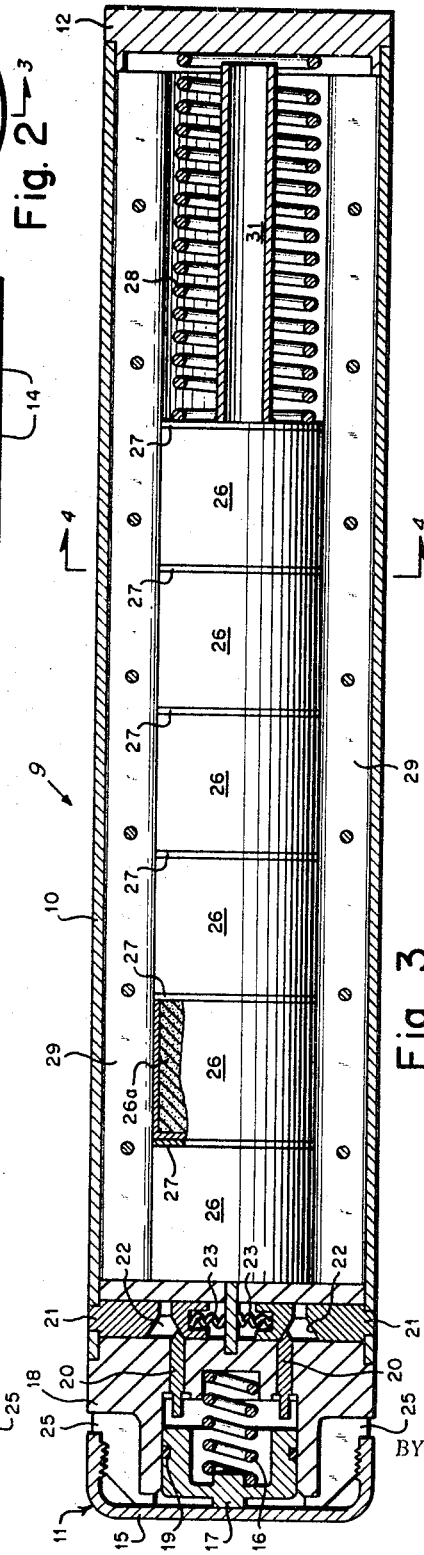
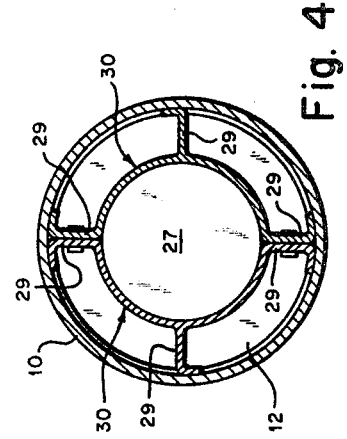
INVENTORS
FRANCIS E. BUCK
JAMES R. BELLACE
ATTORNEY

United States Patent Office 3,447,627
Patented June 3, 1969

---

3,447,627
UNDERWATER SOUND REFLECTOR APPARATUS
Francis E. Buck, Warminster, and James R. Bellace, New Hope, Pa., assignors to the United States of America as represented by the Secretary of the Navy
Filed Sept. 29, 1967, Ser. No. 671,891
Int. Cl. F01n 10/00, 11/00
U.S. Cl. 181—.5   8 Claims

ABSTRACT OF THE DISCLOSURE

An underwater sound reflector apparatus having a cap at one end which, responsive to a predetermined water depth or pressure, disengages from a container body to permit a spring positioned at the aft end of the container to urge out a plurality of pellets which react with water to produce a water insoluble gas. Further included is a plurality of internal stabilizers which fluid dynamically balance the reflector apparatus.

---

The invention described herein may be manufactured and used by or for the Government of the United States of America for governmental purposes without the payment of any royalties thereon or therefor.

Background of the invention

The invention relates to an underwater sound reflector apparatus and more particularly to a launchable, expendable, acoustic target generator used to simulate a submarine or the like.

In order to test the various sonar equipments, it is necessary to provide an underwater sound reflecting target. One such suitable target would be a submarine. However, the utilization of a submarine for sonar test and evaluation purposes is not only extremely costly but also precludes the utilization of that submarine for matters more akin to its designed function. These factors make the utilization of an actual submarine for sonar equipment test purposes highly prohibitory.

Another sound reflector which might possibly be employed for undersea sonar equipment evaluation purposes could comprise a metallic balloon or the like about the size of an actual submarine. The launching of such a reflector, however, is highly expensive and complicated. Even if transported in a deflated state by an aircraft or other launcher, the requisite machinery to inflate the balloon is excessively bulky and massive. Moreover, weights must be applied to assure the submerging of the balloon to submarine depths. Hence, this type of underwater sound reflector is also highly impracticable. Thus the need has evolved for an underwater sound reflector which can be launched from an aircraft or ship with considerable ease and further which is expendable and inexpensive.

Summary of the invention

Accordingly, it is the general purpose of this invention to provide an expendable, launchable, acoustic target generator with known characteristics which may be utilized at a plurality of ocean depths to reflect sonar signals incident thereupon.

The invention utilizes the phenomena that a water insoluable gas, such as hydrogen, bubbling upward toward the surface, produces discontinuities which, upon receiving sound vibrations as from a proximately positioned explosive, simulates the acoustic discontinuities produced by a submarine.

The invention includes, inter alia, a container having a cap, a base, and a plurality of canisters in cascading alignment positioned therebetween. These canisters contain a material which, when contacted by water, chemically reacts to produce a water insoluble gas. Preferably, this material is in a solid state held together by a wax binder. The container cap houses a water pressure responsive piston which moves, as the container descends in the water, against a spring of predetermined elasticity until it engages with and urges forward two pin elements into provided funneled apertures in respective spring biased side locking latches. When these pins seat themselves in the aforementioned apertures the cap disengages from the container and a rear or aft spring at the base of the container expands to urge out the aforementioned canisters.

The container is provided with a plurality of apertures both at the aft end and in the base. Additionally, internal stabilizing fins are secured to the inner wall of the container. Thus, if the container is launched from an aircraft, for example, air enters the apertures at the aft end, is deflected by the fins and then passed through the apertures in the base. In this way the reflector is aerodynamically balanced during the launch to water entry. Upon contacting the water, the container begins to free flood. Water enters through the apertures and is deflected by the fins to hydrodynamically balance the oceanic descent of the apparatus.

Brief description of the drawing

FIG. 1 is a side view of the reflector apparatus showing the container cap, the container body, and the apertures at the aft end thereof;

FIG. 2 is an end view of the reflector shown in FIG. 1;

FIG. 3 is a sectional view taken along line 3—3 of FIG. 2 showing further details in accordance with the invention; and FIG. 4 is a sectional view taken along the line 4—4 of FIG. 3 showing the internal stabilizing fins.

Description of the preferred embodiment

Referring now to the drawing, and more particularly to FIGS. 1, 2 and 3 thereof, there is shown an acoustic reflector 9 comprising a container body 10, having a cap portion 11 and a base portion 12. At the aft end of the container 10 is a plurality of apertures or holes 14. Additional apertures 14a are provided in the base 12 as shown in FIG. 2. The cap portion 11 includes a cap cover 15 which serves to absorb the force of impact when the reflector 9 initially contacts with the water, should it have been launched from an aircraft. A piston-spring 16 is secured at its respective ends to a water pressure or depth responsive piston 17 and to a spring retainer 18. The spring 16 is of preselected elasticity and is normally biased to oppose the motion of piston 17, (as shown). Also within the retainer 18 are two pin elements 20 which protrude from opposite sides theerof. A pair of latches or release pins 21 having funneled apertures 22 therein is positioned to receive the pin elements 20. These latches 21 are biased in abutting contact with the inner wall of container 10 by respective latch springs 23 and thus secure the cap 11 to the container 10. Additionally, a seal 19 surrounds the piston 17. This seal permits the water pressure to act only on the outer surface of the piston 17.

Within the container 10 are a plurality of canisters 26 in cascading alignment each separated from the other by individual spacers 27. An aft spring 28 is positioned between the rearwardmost of the canisters 26 and the base 12 of the container 10 and serves to urge out the canisters upon the disengagement of cap 11, in a manner to be hereinafter described. The aft spring 28 surrounds a canister supporting rod 31 which functions to prevent rearward movement of the canisters 26 should the reflector be stored, transported, or otherwise positioned such that the cap 11 portion is "up" with respect to the aft portion. Rod 31 thus also serves to protect spring 28. The canisters 26 contain a material 26a which reacts with water to produce a water insoluble reflective medium such as hydrogen gas.

This material 26a could, for example, be in pellet form and comprise lithium hydride (LiH), a chemical compound which, upon reacting with water, produces hydrogen gas and lithium hydroxide. The chemical equation governing this reaction is: $LiH+H_2O \rightarrow H_2+LiOH$. Of course, the invention is not limited to the use of lithium hydride as numerous chemicals or materials are available to produce a water insoluble gas in sufficient quantity for sonar test purposes. A few of the other possible choices and their chemical reactions with water are shown below.

Calcium hydride ($CaH_2$):

$$CaH_2+2H_2O \rightarrow 2H_2+Ca(OH)_2$$

Lithium borohydride ($LiBH_4$):

$$LiBH_4+4H_2O \rightarrow 4H_2+LiOH+B(OH)_3$$

Sodium borohydride ($NaBH_4$):

$$NaBH_4+4H_2O \rightarrow 4H_2+NaOH+B(OH)_3$$

Referring now to FIG. 4, it is seen that the container 10 also houses two identical brackets 30, the length of each running from the rear of retainer 18 to the base 12, which, when secured together and to the inner wall of container 10, form a housing for the canisters 26 and aft spring 28. The reflector apparatus 9 was designed to be launched from existing sonobuoy launcher tubes. Such tubes, commonly in use in military aircraft, are formed to receive a substantially smooth right-cylindrical projectile. However, such a shape projectile does not lend itself to fluid dynamic balance. Accordingly, a plurality of protuberances 29 emanating from the brackets 30 function as internal stabilizing fins which aerodynamically and hydrodynamically balance the descent of the reflector apparatus 9 from, respectively, the aircraft to the water and within the water itself by funneling and channeling first the air and then the water, both of which rush in through apertures 14 and out through apertures 14a.

The operation of the apparatus will now be described. During transportation of the reflector 9, an outer container (not shown) serves as a housing therefor. This container is preferably airtight to prevent the pellets 26a from reacting with the moisture in the atmosphere as well as to protect the reflector 9 from environmental stresses. The outer container lid may be provided with a tear strip and constructed in such a manner as to allow the lid to be torn off by hand. When the aircraft is at the desired drop point, the lid of this outermost container is removed and the reflector 9 is launched from, for example, a sonobuoy launcher.

The center of gravity of the reflector 9 is well forward, toward the cap end. This, in conjunction with the internal stabilizing fins 29, causes the reflector 9 to drop much like a bomb, cap or nose first, toward the water.

Upon impacting with the water, cap cover 15 absorbs the attendant shock and the reflector 9 begins to submerge. As the reflector 9 continues to submerge, water enters the cap 11 through suitably provided openings 25 therein and begins to exert a force or pressure on piston 17. This force opposes the bias of piston-spring 16 and tends to urge piston 17 toward pin elements 20.

Since the force on the piston 17 is directly proportional to the depth of the water, and moreover, since it is desired to have the cap 11 disengage at a predetermined depth, the elasticity of the piston-spring 16 may be prechosen to oppose this force, thereby retarding the motion of the piston 17 until the desired depth is reached.

However, once the desired depth is attained, the piston 17 has compressed the spring 16 and has urged against the pin elements 20, thereby forcing them into the respective funneled apertures 22 of the latches 21. As the pin elements 20 seat themselves in the funneled apertures 22, the latches 21 begin to compress latch springs 23. When the pin elements are fully seated in funneled apertures 22, latch springs 23 are compressed to the point where they can no longer lock the cap 11 to the container 10. At this point, the cap 11 disengages from the container 10 and drops away. Aft spring 28, having been in compression, then expands to urge out the canisters 26, thus releasing the pellets 26a. These pellets 26a now react violently with the water to produce water insoluble gas in sufficient and sustained quantity such that it may be used as a target or sound reflector for sonar equipment.

It is also contemplated that, since the water pressure acting on the piston 17 will vary with depth, and further since the surface area of the pitson 17 multiplied by the water pressure yields the force on the piston, the size of such piston may be varied to accommodate greater or lesser amounts of force. Also, for some depths, it is possible to eliminate spring 16, air pressure alone serving to impede the motion of piston 17.

It is to be understood that the above-described arrangements are illustrative of the application of the principles of the invention and of a preferred embodiment for the practicing thereof. It will of course be recognized that numerous modifications and alterations may be made in the above-described sound reflector without departing from the spirit or scope of the invention as set forth in the appended claims.

We claim:
1. A submersible apparatus for producing an acoustic discontinuity comprising:
   a container having a disengageable cap at one end and a base at the other end;
   first means within said container for reacting with water to produce a water insoluble gas;
   second means within said cap responsive to preselectable water pressures for disengaging said cap; and
   third means interposed between said base and said first means for urging out said first means upon disengagement of said cap.

2. Apparatus according to claim 1 which further comprises:
   means within said container for housing said means, said means having stabilizing means for fluid dynamically balancing the descent of said apparatus.

3. Apparatus according to claim 1 wherein said first means includes:
   a plurality of canister means in cascading alignment housing a like plurality of pellet means.

4. Apparatus according to claim 3 wherein said pellet means includes:
   a material chemically reactive with water to produce an acoustic reflective medium.

5. Apparatus according to claim 1 wherein said second means includes:
   piston means operative to move in response to water pressure applied thereto;
   biasing means positioned to impede the motion of said piston means; and disengaging means responsive to the motion of said piston means for disengaging said cap at a predetermined water depth.

6. Apparatus according to claim 5 wherein said disengaging means includes:
   a plurality of pin elements positioned to be urged into and seated within a like plurality of latch means in response to the motion of said piston means, thereby to disengage said latch means from said container.

7. Apparatus according to claim 1 wherein said container comprises:
   a container body of right-cylindrical cross-section having a first plurality of apertures therein at one end thereof and a second plurality of apertures therein in the base thereof;
   said first and second plurality of apertures positioned such that fluid enters the container body through said first plurality and exists through said second plurality.

8. Apparatus according to claim 7 which further comprises:
   stabilizing means within said container body and positioned in proximity with said first and second plurality of apertures for deflecting and channeling said fluid thereby to fluid dynamically balance the descent of said apparatus

References Cited
UNITED STATES PATENTS
2,968,053  1/1961  Gogolick et al.
3,275,976  9/1966  Farmer --------------- 340—2

OTHER REFERENCES
Neubauer, Underseas Technology, vol. 4, No. 4, April 1963, page 11.

RICHARD A. FARLEY, *Primary Examiner.*

U.S. Cl. X.R.

340—5

Disclaimer 3,447,627.—*Francis E. Buck*, Warminster, and *James R. Bellace*, New Hope, Pa. Patent dated June 3, 1969. Disclaimer filed Oct. 15, 1969, by the inventors.

Hereby enter this disclaimer to claims 1, 3, 4, 5 and 6 of said patent.

[*Official Gazette January 20, 1970.*]